Patented Oct. 14, 1924.

1,511,785

UNITED STATES PATENT OFFICE.

URLYN CLIFTON TAINTON, OF JOHANNESBURG, TRANSVAAL, SOUTH AFRICA.

METHOD OF TREATING PULP TO IMPROVE FILTRATION.

No Drawing. Application filed October 2, 1919. Serial No. 327,994.

*To all whom it may concern:*

Be it known that I, URLYN C. TAINTON, a subject of the King of Great Britain, residing at Johannesburg, Transvaal Province, Union of South Africa, have invented new and useful Improvements in Methods of Treating Pulp to Improve Filtration, of which the following is a specification.

This invention relates to a method of treating pulp to improve filtration and particularly to a method for preventing the formation of gelatinous substances which are formed in certain pulps treated by acid.

In the treatment of certain ores with acid for the extraction of metals, it frequently happens that the resultant mixture is difficult to filter. For example, in the ordinary practice of leaching of zinc ores with sulphuric acid, some of the silicates and iron compounds present in the ore dissolve and when the solution is made neutral or nearly so, the silica and iron are precipitated in a gelatinous form, which renders filtration very difficult; that is, the gelatinous substance formed quickly fills the pores of the filtering medium so as to clog the same and render the filter useless.

I have found that the physical condition of such pulp with respect to filtration may be greatly improved by the addition of small quantities of certain re-agents. Such re-agents are fluorides or fluorine compounds.

As an example of the practical operation of the method, I will describe the leaching of a roasted zinc ore with a sulphuric acid solution. The ore is added gradually to the acid solution until about one-half of the total ore that will be required to neutralize the acid has been added.

At this point a quantity of finely powdered sodium fluoride is added amounting to from one-half to one pound per ton of ore treated. The addition of ore is then continued until the ferric sulphate, which is formed, is precipitated as ferric hydrate when the solution containing the zinc sulphate is ready for filtration. It will be found that this pulp will filter much more readily than if the addition of the re-agent had not been made. It will further be found that the gelatinous substance previously referred to is practically eliminated.

Having thus described my invention, what I claim and desire to secure by Letters Patent is—

1. A method of improving the filtration of a pulp obtained by the lixiviation of an ore by a sulphuric acid solution, which pulp has a tendency to become colloidal during lixiviation, which consists in adding a fluorine compound adapted to be decomposed by the sulphuric acid.

2. A method of improving the filtration of a pulp obtained by the lixiviation of an ore by an acid solution, which pulp has a tendency to become colloidal during lixiviation, which consists in adding a fluorine compound adapted to liberate fluorine ions in the solution.

3. A method of treating pulp obtained by leaching of a roasted zinc ore with a sulphuric acid solution to improve filtration, which consists of adding ore to the solution until about one-half of the total ore that will be required to neutralize the acid has been added, at this point adding a quantity of fluorine compound, and then adding additional ore until the ferric sulphate which is formed is precipitated as ferric hydrate, when the solution containing the zinc sulphate is ready or filtration.

4. A method of improving the filtration of pulp obtained by leaching of a roasted zinc ore with a sulphuric acid solution to improve filtration, which pulp has a tendency to become colloidal during lixiviation, which consists in adding a fluoride capable of being decomposed by sulphuric acid.

5. A method of improving the filtration of a pulp obtained by the lixiviation of an ore by an acid solution, which pulp has a tendency to form colloidal substances during lixiviation, which consists in adding a fluorine compound adapted to be decomposed by the acid solution, and which will cause the presence of fluorine ions capable of granulating the colloidal substances formed.

In testimony whereof I have hereunto set my hand in the presence of two subscribing witnesses.

URLYN CLIFTON TAINTON.

Witnesses:
 W. W. HEALEY,
 M. E. EWING.